United States Patent
Thivet

[19]

[11] Patent Number: 5,831,246
[45] Date of Patent: Nov. 3, 1998

[54] LIGHTER BODY FOR A CIGAR LIGHTER, ESPECIALLY FOR MOTOR VEHICLES

[75] Inventor: Gilles Thivet, Labruguiere, France

[73] Assignee: Valeo, Paris, France

[21] Appl. No.: 523,610

[22] Filed: Sep. 5, 1995

[30] Foreign Application Priority Data

Sep. 2, 1994 [FR] France .................................. 94 10744

[51] Int. Cl.⁶ .................................. B60N 3/14; F23Q 7/00
[52] U.S. Cl. .......................................... 219/265; 219/267
[58] Field of Search .................... 219/240–241, 219/267–268, 265, 270

[56] References Cited

U.S. PATENT DOCUMENTS

| | | | |
|---|---|---|---|
| 4,459,464 | 7/1984 | Oda et al. | 219/264 |
| 4,500,774 | 2/1985 | Honjo | 219/265 |
| 4,650,962 | 3/1987 | Pramaggiore | 219/264 |
| 5,223,695 | 6/1993 | Merchel et al. | 219/264 |
| 5,233,162 | 8/1993 | von Gaisberg et al. | 219/265 |
| 5,493,098 | 2/1996 | Diederich | 219/265 |

FOREIGN PATENT DOCUMENTS

| | | |
|---|---|---|
| 200247 | 11/1986 | European Pat. Off. . |
| 437250 | 7/1991 | European Pat. Off. . |
| 495720 | 7/1992 | European Pat. Off. . |
| 511089 | 10/1992 | European Pat. Off. . |
| 544591 | 6/1993 | European Pat. Off. . |
| 2 272 343 | 12/1975 | France . |
| 2502078 | 9/1982 | France . |
| 2684053 | 5/1993 | France . |
| 1950768 | 12/1970 | Germany . |
| 2042701 | 9/1980 | United Kingdom . |

Primary Examiner—John A. Jeffery
Attorney, Agent, or Firm—Longacre & White

[57] ABSTRACT

A lighter body (10) having a sleeve (11) with a base portion (12), a first electrical supply member (4), a safety element (1) with a safety tongue (9), a second electrical supply member (7), and a second electrical insulating member (3), whereby the safety element (1) is in contact with the second electrical supply member (7). The second electrical supply member (7) and the safety element (1) are interposed between the base portion (12) of the sleeve (11) and the second electrical insulating member (3). The safety tongue (9) is adapted to cooperate with a contact portion (8) which is electrically connected to the first electrical supply member (4).

14 Claims, 3 Drawing Sheets

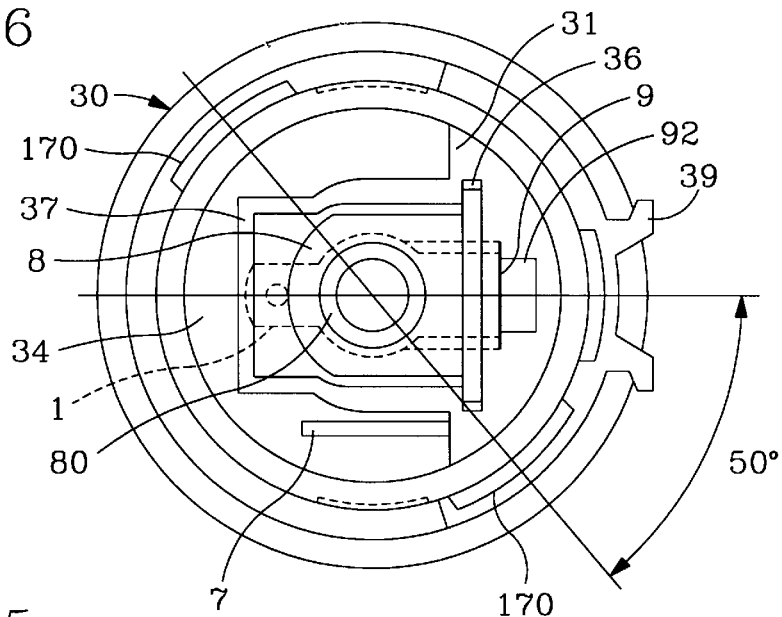
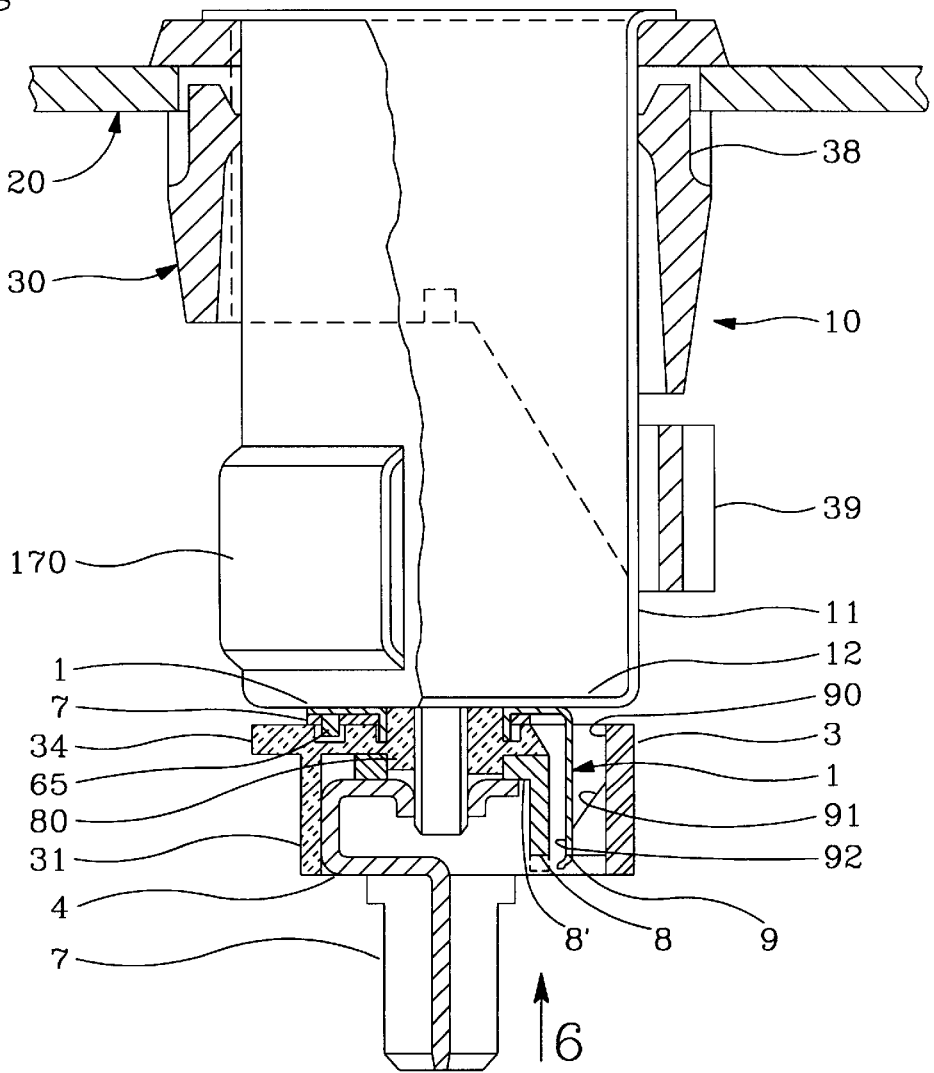

LIGHTER BODY FOR A CIGAR LIGHTER, ESPECIALLY FOR MOTOR VEHICLES

FIELD OF THE INVENTION

The present invention relates to lighter bodies for cigar lighters, especially for motor vehicles, comprising an electrically conductive sleeve closed by a base portion, a fastening member extending through the said base portion, a current collecting member mounted inside the sleeve and connected electrically through the fastening member to a first electrical supply member which is mounted outside the sleeve, a first electrical insulating member interposed between the current collecting member and the base portion of the sleeve, a second electrical supply member mounted outside the sleeve and being adjacent to the base portion of the latter and connected electrically to the said sleeve, a second electrical insulating member interposed between the first and second electrical supply members, a safety element having a safety tongue oriented generally axially and adapted to establish a short circuit in the event of overheating of the lighter body, the said fastening member extending through the electrical insulating members so as to assemble together the electrical supply members and current collection member with the sleeve.

BACKGROUND OF THE INVENTION

Such a body is described in the document FR-A-2 502 078.

This body 10 (FIG. 1) serves, by virtue of its sleeve 11, as a receptacle for a plug 40 which is removably gripped therein, and which has a bell portion 50 containing a heating element such as a resistive heating element.

The sleeve 11 is adapted to be fixed on a fixed wall 20 of the vehicle, for example the fascia or a console of the latter, either directly or through a light-conducting ring 30.

The plug 40 is normally retained in a ready position in the sleeve by means of tongues 16, each of which is formed in the latter by press forming from a slot 17, and which permit dilatation of the tongues of the bimetal strip 5 which conventionally constitutes the current collecting member.

In order to light a cigarette, for example, the occupant of the vehicle pushes on the movable knob 41 which is part of the plug 40, so that the bell portion 50 comes into contact with the bimetal strip 5.

An electric circuit for enabling the heating element to be heated is thus set up, with the aid of electrical supply members 4, 7 which are connected to the poles of the battery of the vehicle. When the heating element reaches a high enough temperature, the tongues of the bimetal strip dilate so as to interrupt the said circuit.

In some cases these tongues can remain in contact with the bell portion 50, despite the fact that the heating element has reached a high enough temperature.

This can be a cause of fire, especially since the wall 20 and the ring 30 are usually made of plastics material.

This is why a safety element has been provided which, in the document FR-A-2 502 078, consists of a tongue constituting a bimetallic contactor, which is an integral part of the bimetal strip or else is independent of the latter. This tongue is adapted to make contact with the sleeve, so as to establish a decisive short circuit which then causes a substantial increase in the electric current, which at once blows the fuses protecting the cigar lighter and so prevents the retention of the heating element in its heating mode from causing a fire.

In practice, this tongue extends axially towards the open end of the sleeve, so that it can become damaged when the plug, or some other current collector, is introduced into the sleeve.

For this reason, and in the light of the document EP-A-0 200 247, orientation of the safety tongue towards the base portion of the sleeve may be considered.

For a given position of the current collecting element, this makes it necessary to increase the axial length of the sleeve, and also that of the first electrical insulating member, if it is not desired to change the plug of the cigar lighter.

For this reason, the use of an arrangement similar to that described in the document DE-A-1 950 768 may be considered, with the safety tongue then being fitted outside the sleeve so as to make contact with a metallic fastening envelope which surrounds the sleeve, to which it is secured by screw fastening;. This tongue is insulated from the sleeve.

All of this adds complication to the process of making the lighter body. In addition, the said safety element is sensitive to the temperature of the current collecting member via the fastening member, so that the heat flow is then not very great.

SUMMARY OF THE INVENTION

An object of the present invention is to overcome these drawbacks in a simple and inexpensive way.

According to the invention, a lighter body of the type described above is characterised in that the safety element is in contact with the second electrical supply member, in that the assembly consisting of the second electrical supply member and the safety element is interposed between the base portion of the sleeve and the second electrical insulating member, and in that, in order to establish a short circuit in the event of overheating of the lighter body, the safety tongue is adapted to cooperate with a contact portion which is connected electrically to the first electrical supply member.

Thanks to the invention, the safety tongue is connected externally to the sleeve, both electrically and thermally. This tongue is therefore sensitive to the heat flow in the sleeve which has a large surface area, and which becomes heated, mainly by radiant heat, when the plug, or a current collector, accidentally remains in contact with the current collecting member. The temperature attained by the sleeve is then less than that which exists in the region of the current collecting member, and, given that the safety element is adjacent to the sleeve, and by virtue especially of the high heat flow in the sleeve, precise action of the safety tongue is obtained so as to produce a short circuit. This safety tongue is also well insulated by the second electrical insulating member from the first supply member and from the fastening member.

In addition, the safety element is thin, so that the length of the fastening member need not be modified.

The safety tongue can be given the required axial length.

Moreover, this does not necessitate any major modification of the lighter body, the sleeve of which remains unaltered, as do the current collecting member and the first electrical insulating ring.

It is thus possible easily to fit the safety element on to an existing lighter body by modification of the second electrical insulating member, which is preferably made of a mouldable material.

The safety element is preferably in contact with the base portion of the sleeve.

It is therefore even more sensitive to the heat flow in the sleeve. Its response (or action) time is thus reduced.

The safety element may of course be interposed between the second electrical insulating member, in contact with the base portion of the sleeve, and the second electrical insulating member.

In all cases, use is made of this second electrical insulating member in order easily to give it, by moulding in a simple and inexpensive way, the appropriate form for mounting of the safety element and the contact portion.

Thus, in one embodiment, the contact portion associated with the first electrical supply member is separate from the latter, being easily positioned by the second electrical insulating member. Thus the first electrical supply member is not modified, and the same is generally true for the second electrical supply member.

The contact portion can then be made in a cheaper metal, and can have the desired thickness and shape. The contact portion may of course be integral with the first electrical supply member. All of this does depend on the application, and in particular that of an inexpensive bimetal strip.

The safety element preferably extends through the second electrical insulating member so that, in normal operation, it makes contact with a projection carried by the said second electrical insulating member.

In this way it is possible to obtain precise adjustment of the distance between the safety tongue and the contact portion associated with it and connected to the first electrical supply member, and this is obtained with a fine safety tongue.

The short circuit is therefore established with even greater precision, with improved control and with very good positioning of the safety tongue, which is only able to be displaced in one dimension.

The safety tongue is preferably fitted in a prestressed condition, in order to reduce dispersion effects and to improve the reliability of the short circuit.

It will be appreciated that the second electrical insulating member can easily be provided with a lug for masking the contact member and the safety tongue.

As a result, these components are protected, especially during transport or storage of the cigar lighter.

In addition, when the power supply connector is connected to the electrical supply members, there is equally no risk of damage to the safety tongue and the contact member.

Accordingly, the safety tongue may have a very fine thickness, well adapted to the temperature of the sleeve in the event of overheating.

The following description illustrates the invention with reference to the attached drawings, in which:

BRIEF DESCRIPTION OF THE DRAWINGS

FIG. 5 is a view similar to FIG. 3 for another embodiment;

FIG. 6 is a view in the direction of the arrow 6 in FIG. 5.

DETAILED DESCRIPTION OF A PREFERRED EMBODIMENT OF THE INVENTION

In FIGS. 3 to 6 the same references are used for those elements that are common to the invention and the prior art.

Accordingly the lighter body 10 of the cigar lighter, here for motor vehicles, comprises an electrically conductive sleeve portion 11 which is closed by a base portion 12, which here has a central hole.

Figure 4:
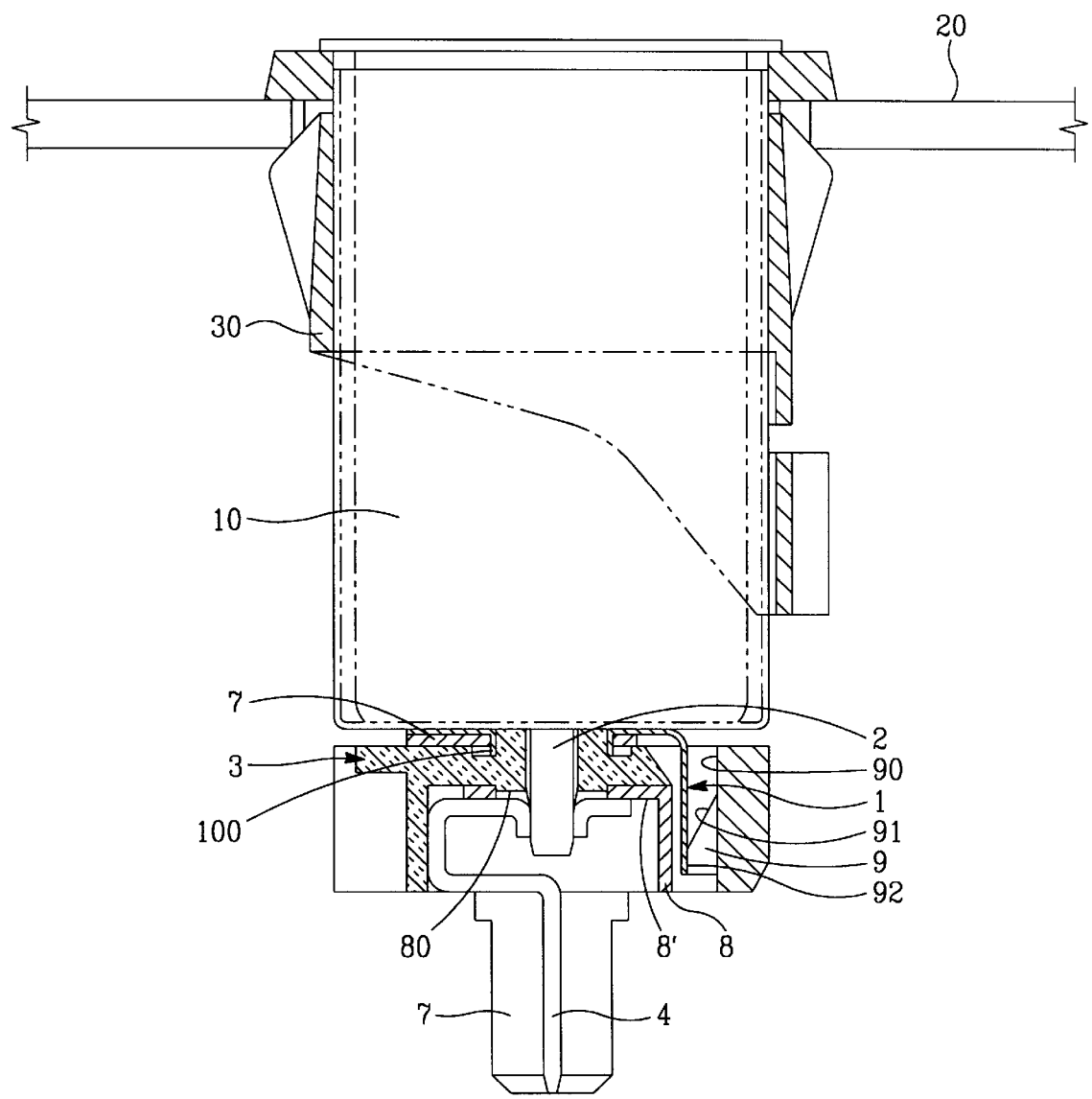
FIG. 4 is a view in partial cross section, similar to FIG. 3 but with the illuminating ring present.

The sleeve 11, which is cylindrical, is made in this example from drawn metal plate, and carries the majority of the components of the lighter body, being, in FIGS. 4 to 6, mounted inside the illuminating ring 30 of plastics material. It has tongues 16 for retaining the plug 40 of FIGS. 1 and 2 in a ready position.

The sleeve 11 carries electrically conductive components, of the metal type in this example, namely a current pick-up member 5 which consists here of a bimetal strip, a fastening member 2 which consists here of a screw, a first electrical supply member 4, and a second electrical supply member 7 which consists here of thin, flat tongues.

It also carries electrically insulating members 6, 3 which are preferably of a mouldable synthetic material such as plastics material.

A first one, 6, of the electrically insulating members 6, 3, referred to as the first insulating member, is mounted inside the sleeve 11, in contact with the base portion 12, and is preferably made of a material which is a thermal insulator. This first insulating member 6 carries the bimetal strip 5, which is also mounted inside the sleeve 11, being clamped between the head of the metal screw 2 and the first insulating member, which constitutes a bimetal strip carrier 6.

The bimetal strip carrier 6 thus constitutes a spacer which is interposed axially between the base portion 12 and the bimetal strip 5, and more precisely between the disc shaped base 53 of the bimetal strip 5 and the base portion 12.

For this reason, the upper face of the bimetal strip carrier 6 is made convex for local contact with the base 53 of the bimetal strip 5, which is U-shaped and comprises two tongues 51, oriented generally axially and located behind slots 17 formed through the sleeve 11. Each tongue 51 has a free end in the form of a hook 52 which constitutes a claw for retaining the bell portion 50 of the plug 40 of FIG. 1 in its heating position.

The members 4, 7, 3 are mounted outside the sleeve 11, on the same side as the outer surface of the base portion 12.

More precisely, the second electrical supply member 7 (the tongue 7) is, in this example, in the form of an angle piece and has a horizontal base portion parallel to the base portion 12 and being connected electrically to the sleeve 11, together with an axially oriented portion which extends through the second electrically insulating member 3, referred to as the second insulating member, via a slot in a manner known per se, so as to prevent relative rotation between the tongue 7 and the member 3.

This tongue 7 is arranged to be connected to the negative pole of the voltage source of the vehicle, in this example the battery of the latter, and is adjacent, through its base, to the base portion 12.

The first electrical supply member 4 (the tongue 4) also has a horizontal base portion parallel to the base portion 12, and an axially oriented portion which is joined to its base portion through an L-shaped junction bend.

The tongue 4 is arranged to be connected to the positive pole of the battery.

The base portion of the member 4 has a central hole which is threaded for screw engagement with the end of the screw 2, for clamping the members 5, 6, 7, 3, 4 together.

The second insulating member 3 constitutes a spacer which is interposed between the tongues 4, 7, and for this purpose it has a horizontal base portion 34 which constitutes an axial spacer between the base portions of the tongues 4, 7, and through the centre of which the screw 2 passes.

The base portion 34 carries, integrally with it, a central bush 32 through which the screw 2 passes. This bush 32 has a polygonal cross section, being rectangular in FIG. 3, and extends in a complementary manner through the central hole of the base portion 12, so as to make complementary engagement in a central recess 61 which is formed in the first insulating member 6.

The above mentioned slot for accommodating the tongue 7 and for holding it against rotation is formed in the edge of the base portion 34.

The base portion 34 is extended outwardly, on the opposite side from the base portion 12, by an axially oriented lug 31 which matches the profile of the junction bend of the tongue 4. The second insulating member thus also constitutes a horizontal spacer between the axial portions of the tongues 4, 7, and mating cooperation is accordingly obtained by means of the second insulating member 3 which, in a manner known per se, prevents relative rotation of the members 6, 7, 3, 4 and locates the tongues 4, 7. In a modification (FIG. 5), the bush 32, the hole in the base portion 12 and the recess 61 may be cylindrical, with the first insulating member 6 having a lateral peg 65 extending through complementary holes formed in alignment with each other in the base portion 12, in the tongue 7, and in the base portion 34 of the member 3 respectively, so as to prevent, by mating cooperation, relative rotation of the said components.

The sleeve 11 also carries a safety element 1 which comprises an axially oriented safety tongue 9 for setting up a short circuit in the event of the lighter body 10 becoming overheated.

With a view to avoiding any major departure from standardisation of the lighter body 10 (and therefore of its plug or its associated current collector), while also having high precision and giving good control over the action of the safety tongue, the invention proposes to establish contact between the safety element 1 and the second electrical supply member 7, to interpose the assembly consisting of the second electrical supply member 7 and the safety element 1 between the base portion 12 of the sleeve 11 and the second electrical insulating member 3, and, in order to establish a short circuit, to cause the safety tongue 9 to cooperate with a contact portion 8 which is connected electrically to the first electrical supply member 4.

In one embodiment (not shown), the safety element 1 is interposed axially between the base portion of the tongue 7, in contact on the base portion 12, and the upper or front surface of the base portion 34 of the second insulating member 3.

In FIGS. 3 to 6, the safety element 1 is in direct contact with the outer face of the base portion 12 of the sleeve 11 and the base portion of the tongue 7, which is itself in contact with the base portion 34.

The sensitivity of the safety element to the heat flowing through the sleeve 12, with its large surface area, is thus increased.

In all cases, the safety element is adjacent to the base portion 12, and is thinner than the tongue 7. It constitutes a bimetallic contactor, which is thin in this example so as to be well adapted to the temperature attained by the sleeve 11 in the event of overheating of the lighter body, with a view to establishing a decisive short circuit.

In the drawings, the safety element is in the form of an angle piece, with a horizontally oriented support portion in contact with the base portion 12 and with the base portion of the tongue 7.

The support portion accordingly extends parallel to the base portion, and is extended, via a rounded portion, by a safety tongue 9 proper, which is oriented axially and which extends away from the base portion 12.

The support portion is provided with at least two axially oriented lugs 100, which are short in length and which extend axially away from the base portion 12.

Each lug 100 engages, through its end, in a recess 33 formed in the upper surface of the base portion 34 at the root of the bush 32.

The support portion of the element 1 has a central hole through which the bush 32 extends, the lugs 100 being formed by outward bending of the material in the operation of press forming the said central hole.

These lugs 100 are engaged in the central aperture in the base portion of the tongue 7.

Due to the fact that the lugs 100 are in contact with the bush 32, rotation of the safety element 1 can be prevented, and it can be indexed in the circumferential sense. The element 1 is thus positioned by the insulating member 3.

The tongue 9 extends through the base portion 34 via an accommodation aperture 90 formed in the said base portion 34.

The aperture 90 is relieved by a chamfer in the vicinity of the recess 33 and of the rounded portion which joins the tongue 9 to its support portion.

The other edge of the aperture is also bounded by a thickened portion of the lug 31, which carries a projection 91, 92 directed towards the axis of the assembly.

This projection 91, 92 is thus carried by the second insulating member 3, and it is integral with the thickened portion of the lug 31.

The projection 91, 92, which is accessible through the aperture 90, comprises a ramp 91 which terminates in a point contact zone 92 for contact with the free end of the safety tongue 9.

The tongue 9 is preferably mounted under prestress between the projection 91, 92 and the bush 32.

The projection 91, 92 is thus wedge-shaped (FIGS. 3, 4 and 5), and it is formed by moulding it in the aperture 90.

Fitting of the safety element 1 is thus easy, due to the fact that it is indexed circumferentially at the level of the said lugs 100, and because the ramp 91 facilitates fitting of the tongue 9 by insertion into the hole 90, with the lugs 100 being gripped between the bush 32 and the edge of the central aperture of the power supply tongue 7.

The back surface of the base portion 34, which faces on the side away from the bush 32, has a thickened portion in the form of a collar 80 which enables the contact portion 8, which in this example is a component separate from the first electrical supply tongue 4, to be centred. Also, the contact portion is integral with a contact member 8'.

The member 8 can thus be made to the required thickness and profile.

This member 8' is shown in the drawings in the form of an angle piece, with a horizontal base portion in contact with the base portion of the tongue 4 and with the base portion 34.

It will be appreciated that the screw 2 thus enables the members 8' and 9 to be assembled together by being clamped between the base portion of the tongue 4 and the base portion 12.

The member 8' has a central hole for fitting over the collar 80 through which the fastening member 2 extends.

The base portion of the member 8' is extended by an axially oriented portion which extends parallel to the security tongue 9 and forms the contact portion 8.

The member 8 is indexed circumferentially in order that its axially oriented portion shall lie in facing relationship with the safety tongue 9. To this end, the collar 80 may be formed with a flat for cooperation with a flat formed in the aperture in the base portion of the member 8'.

The member 8' is thus positioned by the insulating member 3.

The axial portion of the member 8', and the tongue 9, are masked by the lug 31, which defines, with the base portion 34, a blind, outwardly open housing for the said members 8 and 9 and the tongue 4.

In this way, no electric wires are able to come into contact with the tongue 9 and the contact member 8', given that the cigar lighter is fitted in the vehicle in a region in which numerous electric wires and cables are present.

In addition, the connector which is normally connected on the tongues 4 and 7, which are longer than the lug 31, run no risk of damaging the members 8 and 9.

Because of the projection 91, 92, there is a precise air gap between the tongue 9 and the axial portion of the member 8 which is centred by the collar 8. Short circuiting will thus be reliably ensured.

In normal operation, the tongue 9 is in contact with the point contact zone 92 of the projection 91, 92 which defines the apex of the wedge.

Figure 1:
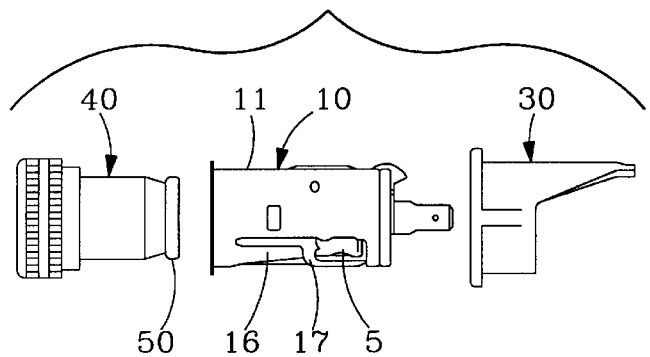
FIG. 1 is an exploded perspective view of a cigar lighter of the prior art.
Figure 2:
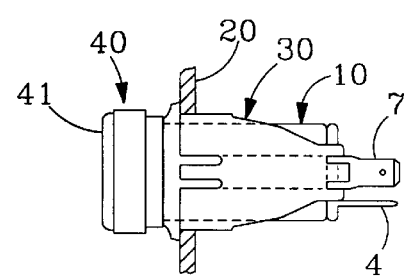
FIG. 2 is a view of the cigar lighter of FIG. 1 mounted on its associated fixed support wall.

If the tongues 51 of the bimetal strip 5 remain accidentally in engagement with the bell portion 50 of the plug 40 in FIG. 1, the sleeve 11 becomes abnormally hot due to the fact that the heating element of the plug is still being supplied with power, so that above a given temperature, the safety tongue 9, constituting a bimetallic contactor, contracts away from its contact at 92 and comes into contact with the axial contact portion of the contact member 8, and so sets up a decisive short circuit which blows a protective fuse, which may be capable of being reset.

Once the temperature of the sleeve has fallen, the tongue 9 dilates so as to regain its normal position.

It will be noted that this movement is limited precisely by the contact point 92.

Thus the bimetallic tongue 9 returns to its precise initial position.

It will be appreciated that the flared aperture 90 and the rounded portion joining the tongue 9 to its support portion are favourable to the movement of the tongue 9, which may be curved so as to make local contact with the member 8 as can be seen in broken lines in FIG. 5, and in order to avoid any adherence to the member 8.

As will have been understood, it is the heat in the sleeve 11 that enables the safety tongue 9 to come into play to establish a smart short circuit. The said sleeve may attain temperatures of the order of 100 degrees in the event of overheating of the heating element in the plug of the cigar lighter.

It will be appreciated that tolerances are reduced because of the projection 91, 92, leading to improved precision.

The present invention is of course not limited to the embodiment described. Thus in FIG. 5, the safety element 1 is prevented from rotating by means of the peg 65 which extends through the support portion of the safety element 1 and the base portion of the tongue 7, so as to penetrate into a blind hole, which is not referenced and which is formed in the base portion 34.

This peg 65, projecting from the first insulating member, extends through the base portion 12, being offset axially with respect to the fastening member 2, which in a modification may consist of a rivet.

The sleeve 11 may be embossed locally outwards in line with the tongues of the bimetal strip, so as to form axially oriented blisters 170 which define a space that enables the said tongues to move.

In this example the blisters 170 have a trapezoidal cross section.

Thus no wire or cable can come into direct contact with the tongues of the bimetal strip.

It will be seen that the invention is applicable to all kinds of sleeve. In particular, the invention can be applied to a cigar lighter of the type described in the document EP-A-0 200 247 mentioned above. In that case, the current collecting element consists of a tongue carrying a contact, and the heating element is carried by the sleeve.

It will also be appreciated that, by virtue of the second insulating member 3, it is easy to prevent any rotation of the contact member 8.

Thus, it can be seen in FIG. 6 that the lug 31 has two grooves 36 for the fitting of the axial portion of the member 8 in the manner of a drawer, which is thus positioned by the insulating member 3, with the base portion of the contact member 8' being fitted over the collar 80.

The U-shaped portion of the lug 31 that prevents the tongue from rotating, by mating cooperation, can be seen at 37 in FIG. 6.

The tongue 4 is not shown in FIG. 6, in the interests of simplification.

Figure 3:
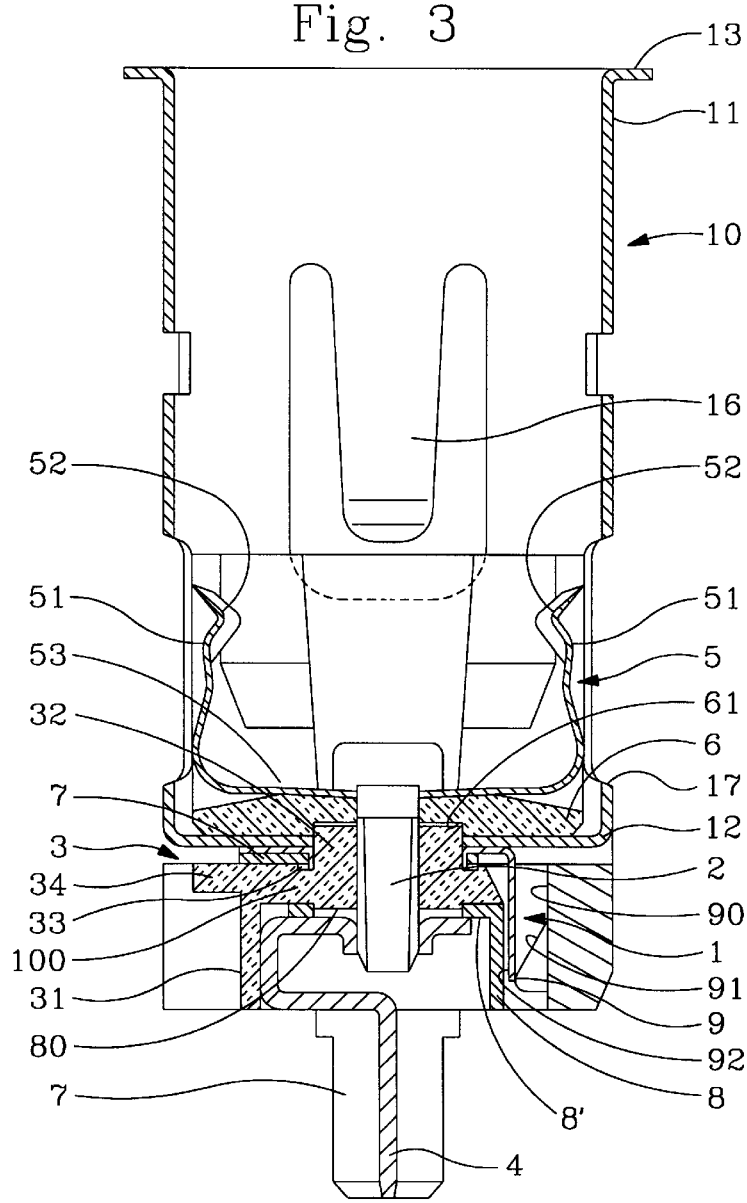
FIG. 3 is a view in axial cross section of a lighter body in accordance with the invention, without its illuminating ring.

It will of course be noticed that in FIG. 5, the support portion of the safety element 1 may have the lugs 100 of FIG. 3 omitted, due to the fact that the said element 1 is indexed by the peg 65.

It will be appreciated that the increase in the thickness of the lug 31 in the region of the projection 91, 92 leads to good support for the safety tongue 9.

In FIG. 6, the tongue 7 extends through the base portion via a rectangular aperture formed in the region of the lug 31. In a modification, the contact member 8' may be integral with the tongue 4, and it will then have, at the level of its base portion, an axially oriented portion for making contact with the tongue 9 in the event of an accident. In all cases, the element 1 and the portion 8 are positioned by the insulating member 3.

FIG. 5 shows, at 38, the resilient lugs of the translucent ring 30 which, in a manner known per se, enable snap fitting on the wall 20 to be obtained, and at 39, a support portion which enables a lampholder to be fitted for supplying light to the ring 30, which, in a manner known per se, carries the sleeve 11, for example with the aid of lugs engaged in associated openings formed in the sleeve.

In some cases the safety element may of course have two safety tongues 9, and may then be U-shaped.

The tongues 4 and 7 may lie parallel to the base portion 12. In a modification, the electrical supply members 4, 7 may consist of pins.

The presence of the projection 91, 92 is not essential, it being possible for the tongue 9 to extend around the base portion 34. In that case it is exposed. Finally, the second insulating member may be integral with the illuminating ring 30.

What is claimed is:

1. A lighter body for a cigar lighter, comprising an electrically conductive sleeve (11) closed by a base portion (12), a fastening member (2) extending through the base portion, a current collecting member (5) mounted inside the sleeve (11) and connected electrically through the fastening member (2) to a first electrical supply member (4) which is mounted outside the sleeve (12), a first electrical insulating member (6) interposed between the current collecting member (5) and the base portion (12) of the sleeve (11), a second electrical supply member (7) mounted outside the sleeve (11) and being adjacent to the base portion (12) of the sleeve (11) and connected electrically to the sleeve (11), a second electrical insulating member (3) interposed between the first (4) and second (7) electrical supply members, a safety element (1) having a safety tongue (4) oriented generally axially and adapted to establish a short circuit in the event of overheating of the lighter body (10), the fastening member extending through the electrical insulating members (6, 3) so as to assemble together the electrical supply members (4, 7) and current collection member (5) with the sleeve (11), wherein the safety element (1) is in contact with the second electrical supply member (7), the assembly consisting of the second electrical supply member (7) and the safety element (1) is interposed between the base portion (12) of the sleeve (11) and the second electrical insulating member (3), the safety tongue (9) is adapted to cooperate with a contact portion (8) which is connected electrically to the first electrical supply member (4), and the free end of the safety tongue (9) cooperates with a projection (91, 92) carried by the second electrical insulating member (3), the projection being directed towards the axis of the assembly.

2. A lighter body according to claim 1, wherein the safety element (1) is in direct contact with the base portion (12) of the sleeve (11) by being interposed axially, through a support portion, between the base portion (12) and the second electrical supply member (7).

3. A lighter body according to claim 1, wherein the safety element (1) is in the form of an angle piece, with a support portion extending parallel to the base portion (12) of the sleeve (11), and an axially oriented portion constituting the safety tongue (9) and joined to the said support portion by means of a rounded portion.

4. A lighter body according to claim 3, in which the second electrical insulating member (3) has a base portion (34) for contact with the second electrical supply member (7), wherein the safety tongue (9) extends through the base portion (34) via an accommodation aperture (90).

5. A lighter body according to claim 4, wherein the accommodation aperture (90) is flared at the level of the rounded portion which joins the safety tongue (9) to its support portion.

6. A lighter body according to claim 1, wherein the projection (91, 92) is wedge shaped and defines at its apex a point contact zone (92) for contact with the free end of the safety tongue (9).

7. A lighter body according to claim 6, in which the second electrical insulating member (3) has a base portion (34) extended outwardly, on the side opposite to the base portion (12) of the sleeve (11), by an axially oriented lug (31), wherein the projection (91, 92) is carried by the lug (31).

8. A lighter body according to claim 1, wherein the projection (91, 92) is formed in a portion of the lug (31) having increased thickness.

9. A lighter body according to claim 1, wherein the projection (91, 92) is accessible through an aperture (90) formed in the base portion (34) of the second electrically insulating member (3) for accommodation of the safety tongue (9).

10. A lighter body according to claim 1, wherein the contact portion (8) comprises an axially oriented portion parallel to the safety tongue (9), for contact with the safety tongue (9) in the event of overheating of the lighter body (10).

11. A lighter body according to claim 1, wherein the contact portion (8) and the safety element (1) are positioned by the second electrically insulating member (3).

12. A lighter body according to claim 1, wherein the contact portion (8) is a part of a contact member (8)' which is separate from the first electrical supply member (4).

13. A lighter body according to claim 12, in which the second electrical insulating member (3) has a base portion (34) with a back surface facing away from the base portion (12) of the sleeve (11), 1, wherein the contact member (8) is in the form of an angle piece having a base portion which is clamped between the base portion (34) and a base portion of the first electrical supply member (3).

14. A lighter body according to claim 1, in which the second electrically insulating member (3) has a base portion (34) extended outwardly, on the side opposite to the base portion (12) of the sleeve (11), by an axially oriented lug, 1, wherein the said lug (31) masks the contact portion (8) and the safety tongue (9).

* * * * *